(No Model.)
R. S. GABBEY.
CULTIVATOR.
No. 444,346. Patented Jan. 6, 1891.
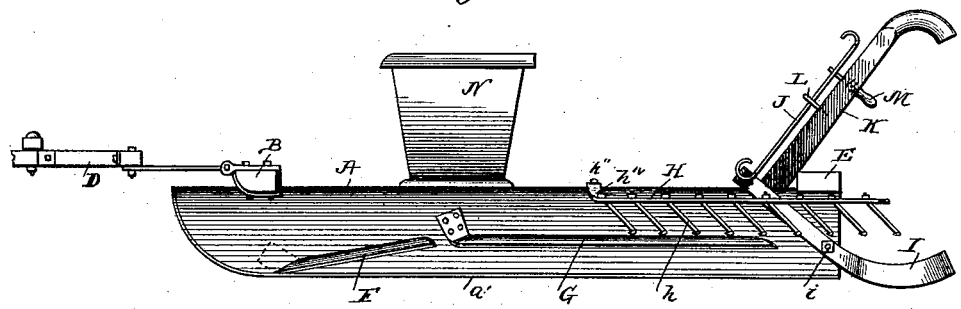
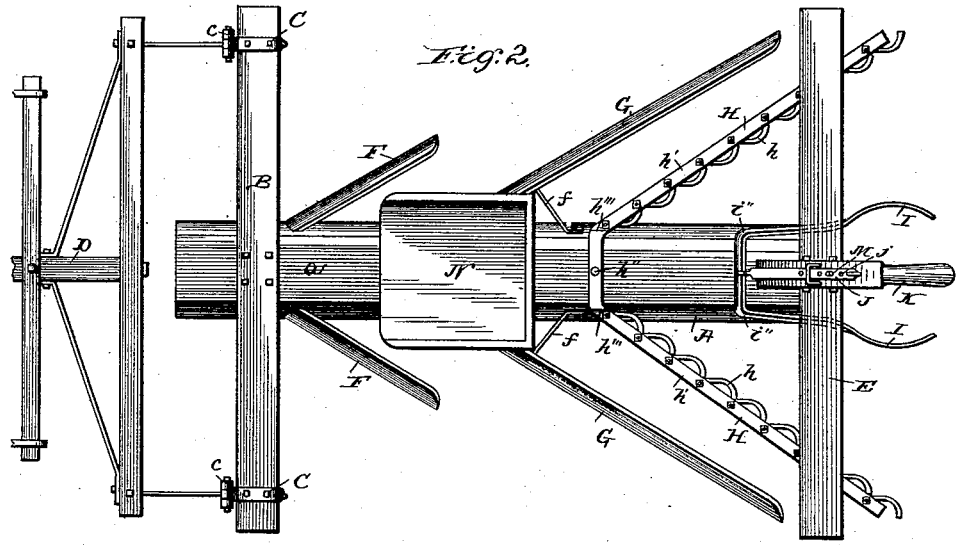
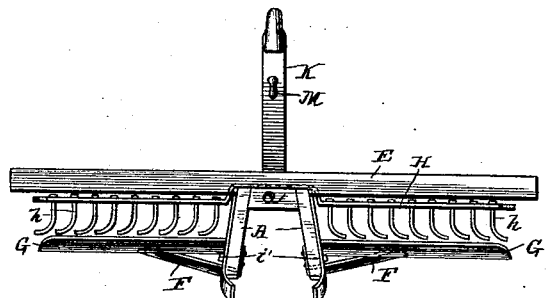
Witnesses.
Wm M. Rheem.
J. R. Andrews.
Inventor.
Robert S. Gabbey
By Knight Bros.
Atty's.

UNITED STATES PATENT OFFICE.

ROBERT S. GABBEY, OF ROSSVILLE, KANSAS.

CULTIVATOR.

SPECIFICATION forming part of Letters Patent No. 444,346, dated January 6, 1891.

Application filed March 7, 1890. Serial No. 342,977. (No model.)

*To all whom it may concern:*

Be it known that I, ROBERT S. GABBEY, a citizen of the United States, residing at Rossville, in the county of Shawnee and State of Kansas, have invented certain new and useful Improvements in Cultivators, of which the following is a full, clear, and exact description.

The present invention relates to "straddle-row" cultivators; and it consists in certain features of novelty that are particularly pointed out in the claims hereinafter, one of the improved cultivators being first fully described with reference to the accompanying drawings, which form a part of this specification, and of which—

Figures 1, 2, and 3 are respectively a plan view, a side elevation, and a rear elevation, of said cultivator.

The "frame" to which the cultivating devices are attached consists of a sled of the requisite length, having a pair of runners A connected at a sufficient distance above the ground and a sufficient distance apart to permit them to straddle the row of growing vegetables. This sled is preferably constructed of two boards about five feet long, one and one-eighth inch thick, and eight inches wide, secured near their upper edges to the respective edges of a board $a$ of the same length, two inches thick, and four inches wide. The edges of the board $a$ are beveled, so that their planes converge upward, causing the runners A to diverge downward, their lower edges being about eight and one-half inches apart. The forward ends of the runners are rounded off, and their under edges are shod with strips of iron $a'$, secured by nails or screws.

B is a cross-tree about four feet long and two by four inches in cross-section, secured by bolts to the top of the sled near the front end thereof, said sled being preferably provided with a half-inch mortise for its reception.

C are clips embracing the cross-tree B and having upon their front sides suitable thill-couplers $c$ for the attachment of a pole D. These cultivators are usually sold without poles, and in order to enable the attachment thereto of a pole of any size the clips C are adjustable on the cross-tree and provided with set-screws or similar devices for securing them at any distance apart.

E is a cross-tree of the same size as B, similarly secured to the top of the sled at its rear extremity. In addition to the function above ascribed to the cross-tree B, both of these cross-trees serve to return the sled to its proper upright position should it by any means be canted to one side or the other. In doing so they come in contact with the ridges of earth that have been thrown up between the rows by the lister. Their front lower edges are rounded off, so as to give them an upward impetus when they strike the ground.

To the inner side of each of the runners, near the front end thereof, is secured one end of a blade F, which is bent so as to pass out between the shoe $a'$ and the wooden portion of the runner, the latter being suitably notched for the purpose. This blade is about sixteen inches long and is made of steel two inches wide and one-fourth inch thick, sharpened at its front edge. It is bent in such a manner that it projects from the lower edge of the runner outward, upward, and rearward. It forms an angle of about thirty degrees with the vertical plane of the runner and an angle of about fifteen degrees with the horizontal plane of the runner, its outer extremity being about three inches above its inner extremity. Furthermore, its front edge is about five degrees lower than its rear edge, the object of which is to cause it to "draw."

To the outside of each runner, a little forward of its mid-length and about two and one-half inches from its lower edge, is attached the inner end of a steel blade G, similar in cross-section to the blade F and forming about the same angle with the vertical plane of the runner. This blade G is about three feet in length and is parallel with the horizontal plane of the runner; or, in other words, it is horizontal, assuming the sled to be so. Like the blade F, and for a like reason, its front edge is about five degrees lower than its rear edge. A brace $f$, secured at one end to the runner and at the other end to the blade G, gives the latter strength and rigidity.

H is a harrow consisting of a number of teeth $h$, secured to a frame $h'$ of approximately V shape, loosely pivoted at its angle or apex to the top of the sled, as at $h''$. The frame is formed of a piece of iron one-fourth inch thick and one and one-fourth inch wide, bent at $h^{III}$ and again at $h^{IV}$, so that its middle portion may rest flat upon the top of the sled, while its end portions, to which the teeth are secured, may occupy a horizontal plane some distance below it. The teeth are secured to the frame, so that their upper portions extend downward and rearward at an angle of forty-five degrees, while their lower portions are flattened, sharpened on their front sides, and curved outward, substantially as shown.

I I is a pair of blades pivotally secured by means of bolts $i$ to the respective runners A near their rear extremities and about midway between their upper and lower edges. These blades are connected so that they move together. In fact, they are formed of a single steel plate, which extends across the top of the sled and is bent at $i^{II}$, so as to extend downward on both sides of the sled, resting flat against the outer surfaces of the runners. The pivot-bolts $i$ pass through those portions of the blades that rest flat against the runners, and beyond said pivots the blades are curved, so as to extend first outward and then inward, their rear extremities being about eight inches apart. To that portion of the plate which forms the connection between the blades proper is loosely connected the lower end of a rod J, which is provided at its upper end with a suitable handle. This rod extends along the top side of the cultivator-handle K and is secured to it loosely, so as to be capable of longitudinal movement by a staple L. By sliding this rod up or down the lower extremities of the blades I will be lowered or raised, so as to project downward below the bottoms of the runners to any desired extent, or so as to be entirely above them and out of contact with the ground, as may be desired. A suitable detent is provided for holding the rod J in any position desired. For this purpose I provide the rod near its upper end with a series of holes $j$ and secure to the cultivator-handle K a spring-bolt M, adapted at the will of the operator to engage any hole of the series.

N is a box secured to the top of the sled at about its mid-length and designed to contain a quantity of iron, stone, earth, or other substance for adding weight to the cultivator when the condition of the ground is such as to require it; or, instead of the weight in the box, a boy may sit on the top of it, the lid $n$ being suitably formed for the purpose.

Having thus described my invention, the following is what I claim as new and desire to secure by Letters Patent:

1. The combination, with the sled, of the blades F and G, attached thereto and projecting outward and rearward therefrom, the blades G being behind and attached at a higher level than the blades F, substantially as set forth.

2. The combination, with the sled, of the blades F, attached thereto near the front end and projecting from the bottom of the runner upward, outward, and rearward, and the blades G, attached to the sled behind and at a higher level than the blades F and projecting outward and rearward, substantially as set forth.

3. The combination, with the sled, of the blades F, projecting outward and rearward therefrom, and the longer blades G, attached to the sled behind blades F and projecting outward and rearward, substantially as set forth.

4. The combination, with a sled, of a harrow having a rigid V-shaped frame pivoted at its angle to the sled, substantially as set forth.

5. The combination, with the sled, of the harrow having a rigid V-shaped frame pivoted at its angle to the top of the sled and having the bends $h^{III}$ and $h^{IV}$, substantially as set forth.

6. The combination of the harrow-frame and the teeth inclined downward and rearward and having their lower portions bent sidewise with respect to the line of draft, so as to form hooks, substantially as set forth.

7. The combination, with the sled, of the harrow secured thereto and projecting outward and rearward therefrom, said harrow having teeth inclined rearward and bent outward at their lower ends, substantially as set forth.

8. The combination, with the sled, of blades F and G, projecting outward and rearward therefrom, the blades G being longer than blades F and situated behind them, and the V-shaped harrow attached to the sled behind blades G and projecting outward as far as said blades, substantially as set forth.

9. The combination, with the sled and the handle K, of the blades I, pivoted to the sides of the sled and connected by a part extending across it, the operating-rod J, connected at its lower end to said part and extending upward along the handle, and means for locking said rod, substantially as set forth.

10. The combination, with the sled, of the blades F and G, projecting outward and rearward therefrom, the blades G being longer than blades F and situated behind them, the V-shaped harrow having the rigid frame attached to the sled in rear of blades G, the blades I, pivoted to the sled and projecting rearward, the rod J for operating said blades I and means for locking said rod, substantially as set forth.

ROBERT S. GABBEY.

Witnesses:
WM. HUDSON,
GEORGE E. COOKE.